(12) United States Patent
Yoo et al.

(10) Patent No.: US 10,661,508 B2
(45) Date of Patent: May 26, 2020

(54) METHOD THAT FORMS PATTERN ON FABRIC MEMBER AND FIXES PATTERN ON TRIM

(71) Applicants: Hyundai Motor Company, Seoul (KR); Kia Motors Corporation, Seoul (KR); Adient Automotive Interiors Korea Inc., Pyeongtaek-si (KR)

(72) Inventors: Dong Keun Yoo, Ansan-si (KR); Chang Dong Kim, Suwon-si (KR); Eun Ho Choi, Ansan-si (KR)

(73) Assignees: Hyundai Motor Company, Seoul (KR); Kia Motors Corporation, Seoul (KR); Adient Automotive Interiors Korean Inc., Pyeongtaek-si (KR)

( * ) Notice: Subject to any disclaimer, the term of this patent is extended or adjusted under 35 U.S.C. 154(b) by 458 days.

(21) Appl. No.: 15/609,154

(22) Filed: May 31, 2017

(65) Prior Publication Data

US 2018/0141281 A1  May 24, 2018

(30) Foreign Application Priority Data

Nov. 18, 2016 (KR) ........................ 10-2016-0153847

(51) Int. Cl.
  *B29C 65/00* (2006.01)
  *B29C 35/00* (2006.01)
  (Continued)

(52) U.S. Cl.
  CPC ...... *B29C 65/7805* (2013.01); *B29C 35/0261* (2013.01); *B29C 43/18* (2013.01);
  (Continued)

(58) Field of Classification Search
  CPC ....... B29C 35/00; B29C 35/02; B29C 35/026; B29C 35/0261; B29C 43/00; B29C 43/10;
  (Continued)

(56) References Cited

U.S. PATENT DOCUMENTS

| 6,012,765 A * | 1/2000 | Novoa | B62D 33/06 296/190.08 |
| 8,568,131 B2 * | 10/2013 | Song | B29C 45/14262 425/504 |
| 2008/0284053 A1 * | 11/2008 | Dutouquet | B29C 33/424 264/102 |

FOREIGN PATENT DOCUMENTS

| JP | 01221224 A | 9/1989 |
| JP | 2002283459 A | 10/2002 |

(Continued)

*Primary Examiner* — Jacob T Minskey
*Assistant Examiner* — Matthew Hoover
(74) *Attorney, Agent, or Firm* — Slater Matsil, LLP

(57) ABSTRACT

A method can be used to attach a fabric member to a trim while forming a pattern in the fabric member. A trim has trim grooves formed in one side of the trim and a fabric member has a foam formed in one side of a skin material of the fabric member. A bonding member is coated to an outer surface of the foam and the fabric member is heated where the bonding member is coated. The heated fabric member is placed on the side of the trim where the trim grooves are formed. The fabric member is fixed to the trim by inserting edges of the fabric member into the trim grooves using insertion blades while pattern protrusions formed in a compression jig form a pattern by pressing the skin material of the fabric member.

9 Claims, 7 Drawing Sheets

(51) Int. Cl.
  *B29C 63/00* (2006.01)
  *B29C 65/78* (2006.01)
  *B29C 35/02* (2006.01)
  *B29C 43/18* (2006.01)
  *B29C 43/52* (2006.01)
  *B29C 63/02* (2006.01)
  *B29C 65/08* (2006.01)
  *B29C 65/52* (2006.01)
  B29L 31/30 (2006.01)
  B29C 59/02 (2006.01)

(52) U.S. Cl.
  CPC .......... *B29C 43/52* (2013.01); *B29C 63/0065* (2013.01); *B29C 63/0073* (2013.01); *B29C 63/02* (2013.01); *B29C 65/08* (2013.01); *B29C 65/522* (2013.01); *B29C 66/721* (2013.01); *B29C 66/727* (2013.01); *B29C 59/02* (2013.01); *B29C 2043/525* (2013.01); *B29C 2063/022* (2013.01); *B29K 2913/00* (2013.01); *B29L 2031/3005* (2013.01); *B29L 2031/3014* (2013.01)

(58) Field of Classification Search
  CPC ......... B29C 43/18; B29C 43/50; B29C 43/52; B29C 63/00; B29C 63/006; B29C 63/0065; B29C 63/007; B29C 63/0073; B29C 63/02; B29C 65/00; B29C 65/08; B29C 65/50; B29C 65/52; B29C 65/522; B29C 65/70; B29C 65/78; B29C 65/78; B29C 65/7805; B29C 66/00; B29C 66/70; B29C 66/72; B29C 66/721; B29C 66/727
  See application file for complete search history.

(56) References Cited

FOREIGN PATENT DOCUMENTS

| | | | |
|---|---|---|---|
| JP | 4118597 | B2 | 7/2008 |
| KR | 100139665 | B1 | 6/1998 |
| KR | 1020030047280 | A | 6/2003 |
| KR | 101414463 | B1 | 7/2014 |

* cited by examiner

METHOD THAT FORMS PATTERN ON FABRIC MEMBER AND FIXES PATTERN ON TRIM

CROSS-REFERENCE TO RELATED APPLICATIONS

This application claims priority to and the benefit of Korean Patent Application No. 10-2016-0153847 filed in the Korean Intellectual Property Office on Nov. 18, 2016, the entire contents of which are incorporated herein by reference.

TECHNICAL FIELD

Embodiments of the invention relate to a method that forms a pattern on a fabric member and fixes the pattern on trim.

BACKGROUND

In general, a method that applies an embossing to a door trim, performs painting, or applies a skin material has been used for gentrification of a vehicle.

In order to apply a skin material (e.g., an artificial leather) to a door trim, a skin material where a foam is formed may surround an additional part and the part surrounded by the skin material may be attached to the door trim.

However, a process for surrounding the skin material around the additional part and a process for attaching the part surrounded by the skin material to the trim are separately required, thereby deteriorating a production cost and efficiency.

In addition, the number and weight of parts are increased because a fixing means is required for attaching the part to the trim, a vibration noise is generated, uniformity of an embossing/stitch shape formed in the skin material is determined, design satisfaction is deteriorated, and the surface of the skin material may be damaged or a detail of the pattern may be deteriorated.

The above information disclosed in this Background section is only for enhancement of understanding of the background of the invention and therefore it may contain information that does not form the prior art that is already known in this country to a person of ordinary skill in the art.

U.S. Pat. No. 8,568,131 and Korean Patent No. 10-1414463 disclose subject matter that is related to subject matter disclosed herein.

SUMMARY

Embodiments of the present invention relate to a method for attaching a fabric member to a trim while forming a pattern in the fabric member that is fixed to the trim by being inserted thereinto by insertion blades, and a system using the same.

Embodiments of the present invention provide a method for attaching a fabric member to a trim while forming a pattern in the fabric member to thereby improve productivity while reducing a cost of a process for surrounding a trim with a skin member and improve an aesthetic appearance.

According to an exemplary embodiment, the present invention provides a method for attaching a fabric member to a trim while forming a pattern in the fabric member is provided. The method includes preparing a trim where trim grooves are formed in one side of the trim. The method also includes cutting a fabric member of which a foam is formed in one side of a skin material of the fabric member. A bonding member is coated to an outer surface of the foam and the fabric member is heated where the bonding member is coated. The heated fabric member is placed on one side of the trim where the trim grooves are formed. The fabric member is fixed to the trim by inserting edges of the fabric member into the trim grooves using insertion blades while pattern protrusions formed in a compression jig form a pattern by pressing the skin material of the fabric member.

The heating may be performed by a heater.

The cutting may be performed by a cutter.

The coating of the bonding member may be performed by a coating device that sprays the bonding member.

In the fixing of the fabric member to the trim, the insertion blades fixed to a mold may penetrate one side of the compression jig and may insert the edges of the fabric member into the trim grooves while the pattern protrusions formed in the compression jig form the pattern by pressing the skin material of the fabric member.

The heater may be provided separately from a mold.

The heater may be provided in one side of the mold and applies heat to the fabric member that is placed on the trim.

The method may further include disposing the compression jig on the fabric member.

The mold may press the compression jig and thus the compression jig may compress the fabric member.

According to another exemplary embodiment of the present invention, a system that attaches a fabric pattern to a trim while forming a pattern in the fabric member is provided. The system includes a first mold where a trim having trim grooves is placed at a predetermined location. A fabric member has a predetermined shape and is placed on the predetermined location of the trim. A compression jig is disposed on the fabric member, and of which pattern protrusions that form a pattern in the fabric member and fixing protrusions that fix the fabric member to the trim are formed at predetermined locations. A second mold of which injection blades are formed protrudes at predetermined locations of a molding side of the second mold and partially presses the fabric member to fix the fabric member to the trim by inserting the fabric member into the trim.

The system may further include a heater that heats the fabric member.

The system may further include a cutter that cuts the fabric member into a predetermined shape before the fabric member is being heated by the heater.

The heater may be provided in a molding side of the second mold.

The system may further include a coating device that coat a bonding member to one outer surface of the fabric member before the fabric member is being heated by the heater.

The fabric member may include a skin material that is exposed to the outside and a foam formed in one side of the skin material.

The insertion blades may fix the fabric member by penetrating the compression jig and inserting the fabric member into the trim grooves.

A mounting surface of the first mold, on which the trim is placed, may be formed along the shape of the trim.

According to the exemplary embodiment of the present invention, the trim is integrally formed and the pattern is formed at the outer surface of the fabric member while attaching the fabric member to the integrally formed trim so that productivity can be improved, a manufacturing cost can be saved, and an exterior appearance can be aesthetically improved.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
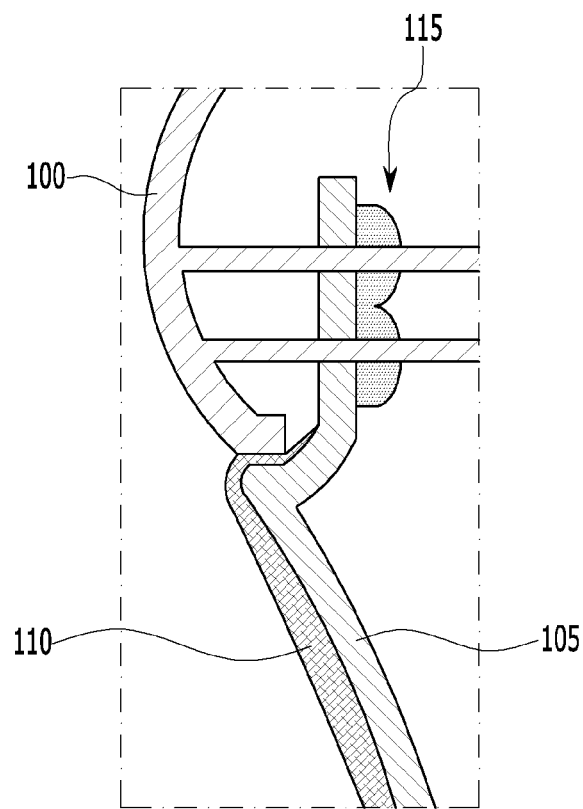
FIG. 1 is a partial cross-sectional view of a trim related to the present invention.

Hereinafter, an exemplary embodiment of the present invention will be described in detail with reference to the accompanying drawings.

However, the size and thickness of each component illustrated in the drawings are arbitrarily shown for ease of description and the present invention is not limited thereto, and the thicknesses of portions and regions are exaggerated for clarity.

The drawings and description are to be regarded as illustrative in nature and not restrictive, and like reference numerals designate like elements throughout the specification.

Further, in the following detailed description, names of constituents, which are in the same relationship, are divided into "the first", "the second", etc., but the present invention is not necessarily limited to the order in the following description.

FIG. 1 is a partial cross-sectional view of a trim related to the present invention.

Referring to FIG. 1, a door includes a lower trim 100, a center trim 105, a fixing portion 115, and a fabric member 110, and the fabric member 110 surrounds the center trim 105 and the center trim 105 is fixed to the lower trim 100 through the fixing portion 115.

In the present invention, the lower trim 100 and the center trim 105 are integrally formed, a pattern is formed at an outer surface of the fabric member 110 while simultaneously attaching the fabric member 110 to the integrally formed trim such that productivity can be improved, producing cost can be saved, and an exterior appearance can be aesthetically improved.

Figure 2:
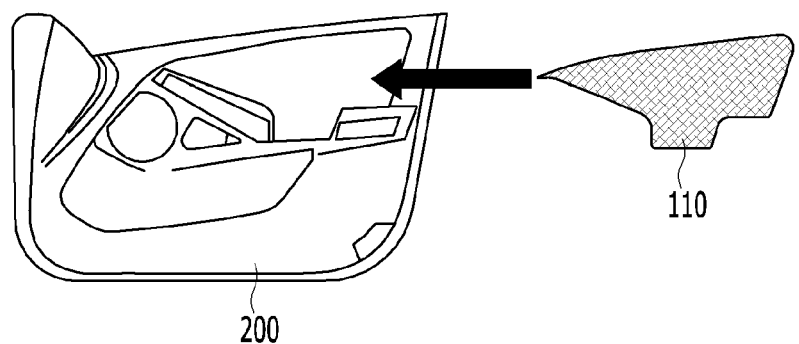
FIG. 2 is a schematic side view of a method that forms a pattern in a fabric member and attaches the fabric member to the trim according to an exemplary embodiment of the present invention.

FIG. 2 is a schematic side view that illustrates a method for attaching a fabric member to a trim while forming a pattern in the fabric member.

Referring to FIG. 2, in the exemplary embodiment of the present invention, the fabric member 110 cut into a predetermined shape is bonded to the integrally formed trim 200 and at the same time the pattern is formed in the surface of the fabric member 110, and accordingly productivity can be improved, a producing cost can be saved, and the weight also can be reduced.

Figure 3:
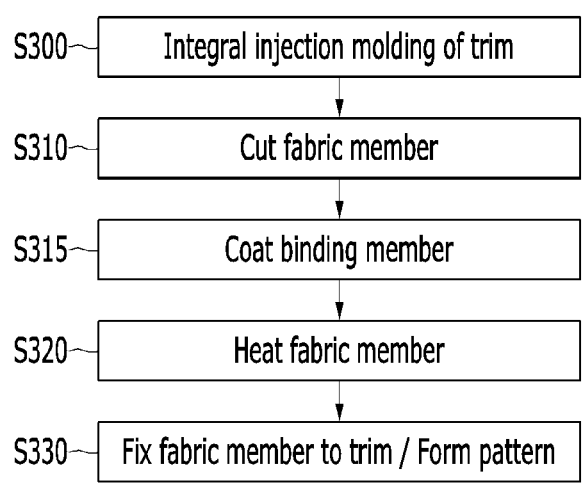
FIG. 3 is a flowchart of a method that forms the pattern in the fabric member and attaches the fabric member to the trim according to the exemplary embodiment of the present invention.

FIG. 3 is a flowchart of a method for attaching the fabric member to the trim while forming the pattern in the fabric member according to the exemplary embodiment of the present invention.

Referring to FIG. 3, the trim 200 is integrally formed in step S300, the fabric member 110 is cut into a predetermined shape in step S310, and a bonding member 420 is coated to one side of the fabric member 110 in step S315. Here, the step S300 and the step S310 may be sequentially or simultaneously performed.

The fabric member 110 where the bonding member 420 is coated is heated at a predetermined temperature range in step S320, and the heated fabric member 110 is attached to a predetermined region of the integrally formed trim 200 and then fixed thereto. Here, the bonding member 420 is attached to the trim 20 and the pattern is formed in an outer surface of the fabric member 110.

Figure 4:
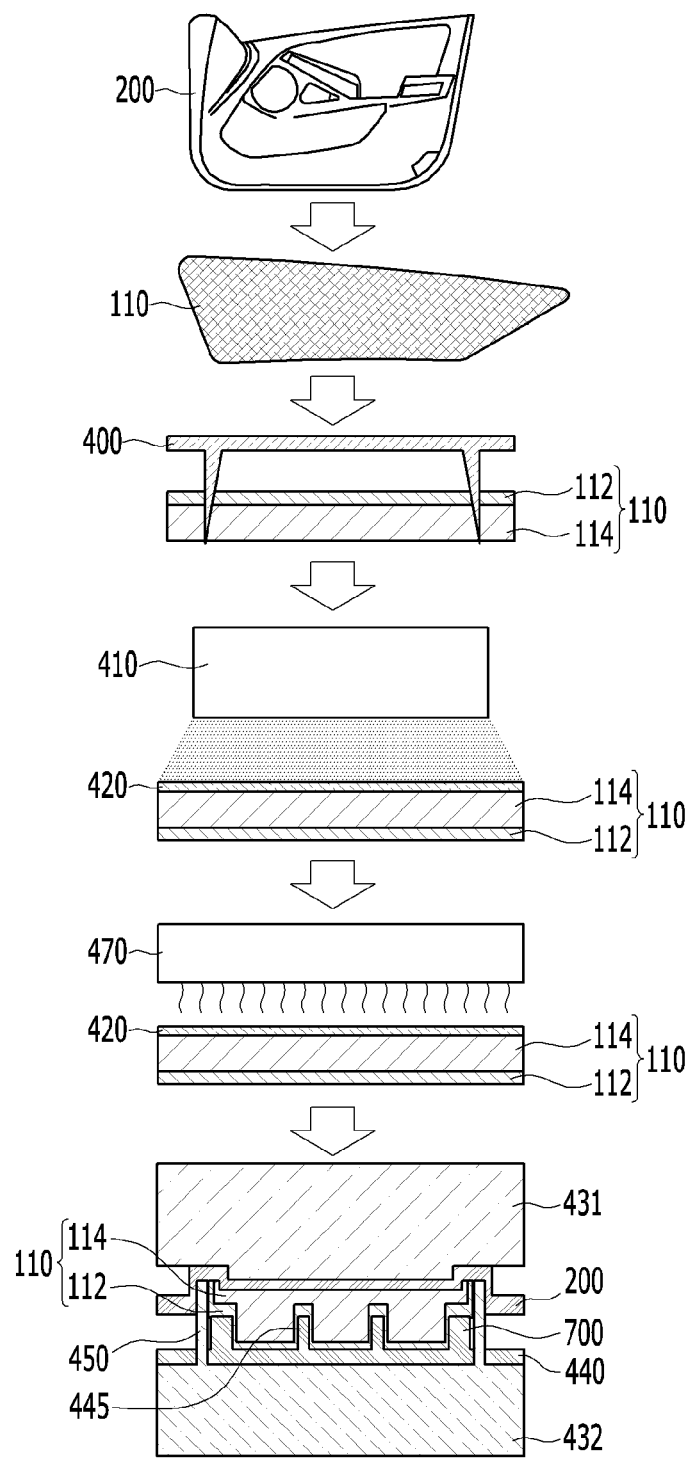
FIG. 4 is a flowchart of a method that forms a pattern in a fabric member and attaches the fabric member to a trim according to another exemplary embodiment of the present invention.

FIG. 4 is a flowchart of the method for attaching the fabric member to the trim while forming the pattern in the fabric member, and the process generally corresponds to the order of FIG. 3.

Referring to FIG. 4, the trim 200 is integrally formed. A method for molding the trim 200 refers to a known method.

First, the fabric member 110 is cut into a predetermined shape using a cutter 400, and the bonding member 420 is coated to one side of the fabric member 110 using a bonding member coating device 410.

In the exemplary embodiment of the present invention, the fabric member 110 includes the skin material 112 and a soft foam 114 formed at one side of the skin member 112, and the bonding member 420 is coated to an outer surface of the foam 114.

In addition, the heater 470 heats the fabric member 110 coated with the bonding material 420 at a predetermined temperature, and the heated fabric member 110 is fixed to the trim 200 by using a first mold 431 and a second mold 432 and then the pattern is formed.

Referring to the lower part of the flowchart in FIG. 4, a molding unit includes the first mold 431, the second mold 432, a compression jig 440, pattern protrusions 445, insertion blades 450, and the trim 200, and the fabric member 110 is disposed between the trim 200 and the compression jig 440.

The compression jig is placed on the second mold 432, and the pattern protrusions 445 and the fixing protrusions 700 are provided at predetermined locations on an upper side of the compression jig 440.

The pattern protrusion 445 presses the skin material 112 of the fabric member 110 during a press process such that a pattern is formed, and the fixing protrusions 700 press the outer surface of the fabric member 110 to closely attach the fabric member 110 to the trim 200.

The insertion blades 450 that protrude upwardly are formed at opposite edges of the second mold 432, and penetrate the compression jig 400 and insert the opposite edges of the fabric member 110 into trim grooves 500 formed in the trim 200 such that the fabric 110 is fixed to the trim 200. Here, the trim 200 may be disposed in a bottom side of the first mold 431.

In the exemplary embodiment of the present invention, the location of the first mold 431 and the location of the second mold 432 may be switched. That is, the first mold 431 may be disposed in the lower portion and the second mold 432 may be disposed in the upper portion.

Figure 5:
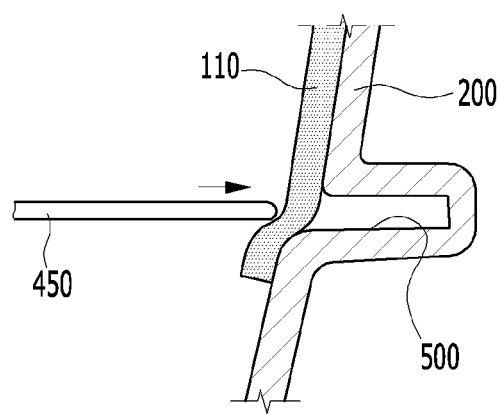
FIG. 5 is a cross-sectional view of a method that finished an edge of the fiber material by fixing the edge to the trim according to the exemplary embodiment of the present invention.
Figure 5:
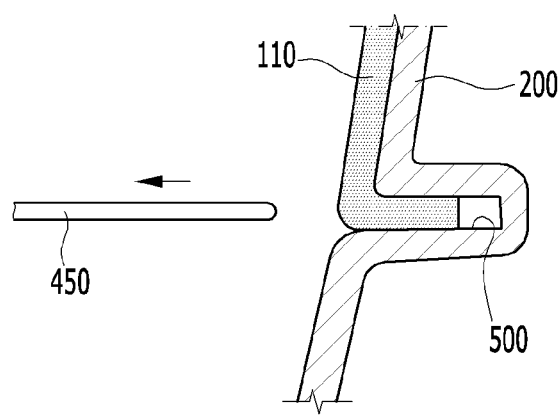

FIG. 5 is a cross-sectional view of a method for finishing the edge of the fabric member by fixing the edge to the trim according to the exemplary embodiment of the present invention.

Referring to FIG. 5, the trim groove 500 is formed at the predetermined location in the trim 200, and when the insertion blade 450 presses the edge of the fabric member 110 while the fabric member 110 is attached to one side of the trim 200, the insertion blade 450 is inserted into the trim groove 500 together with the fabric member 110 such that the fabric member 110 is inserted into the trim groove 500 and then fixed thereto.

Figure 6:
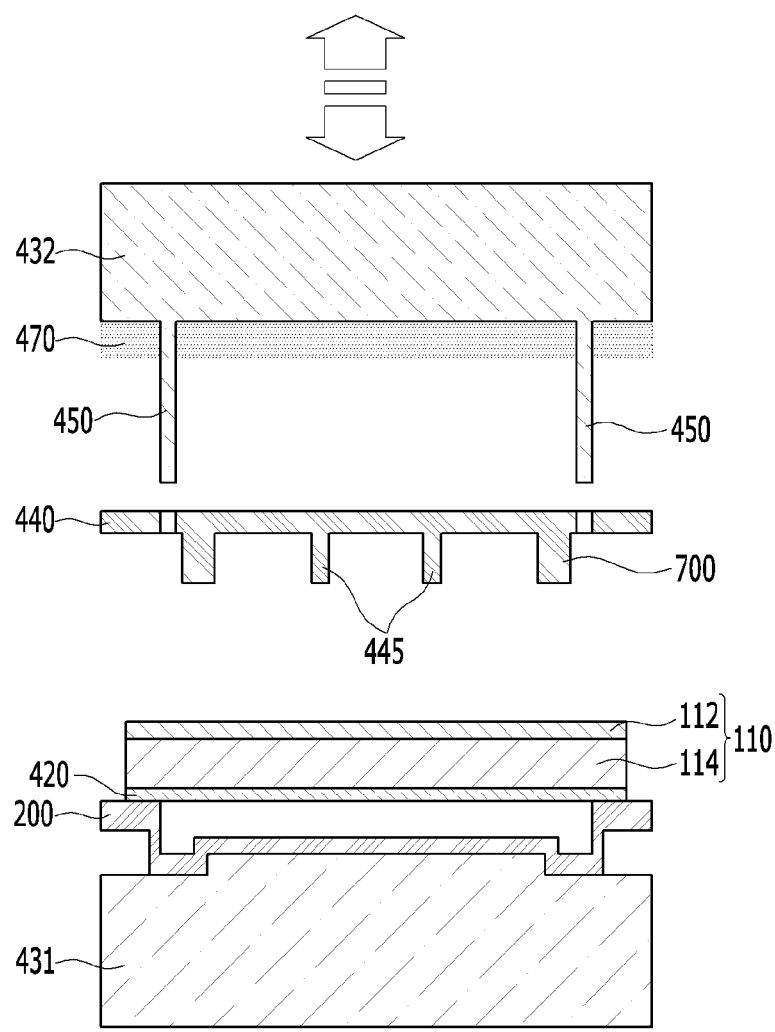
FIG. 6 is a schematic cross-sectional view of a system that forms a pattern in a fabric member and attaches the fabric member to a trim according to an exemplary embodiment of the present invention.

FIG. 6 is a schematic cross-sectional view of a system that attaches the fabric member to the trim while forming a pattern in the fabric member according to the exemplary embodiment of the present invention.

Referring to FIG. 6, the first mold 431 is disposed in the lower portion, and the trim 200 is placed on the first mold 431. Then, the fabric member 110 is disposed on the trim 200.

The insertion blades 450 extend downwardly from the predetermined locations of the bottom of the second mold 432, and a heater 470 may be disposed in the bottom side of the second mold 432. The heater 470 disposed in the bottom side of the second mold 432 heats the fabric member 110 that is placed on the trim 200 at a predetermined temperature.

Next, the compression jig 440 is injected between the heater 470 and the fabric member 110 such that the compression jig 440 is placed on the fabric member 110.

Figure 7:
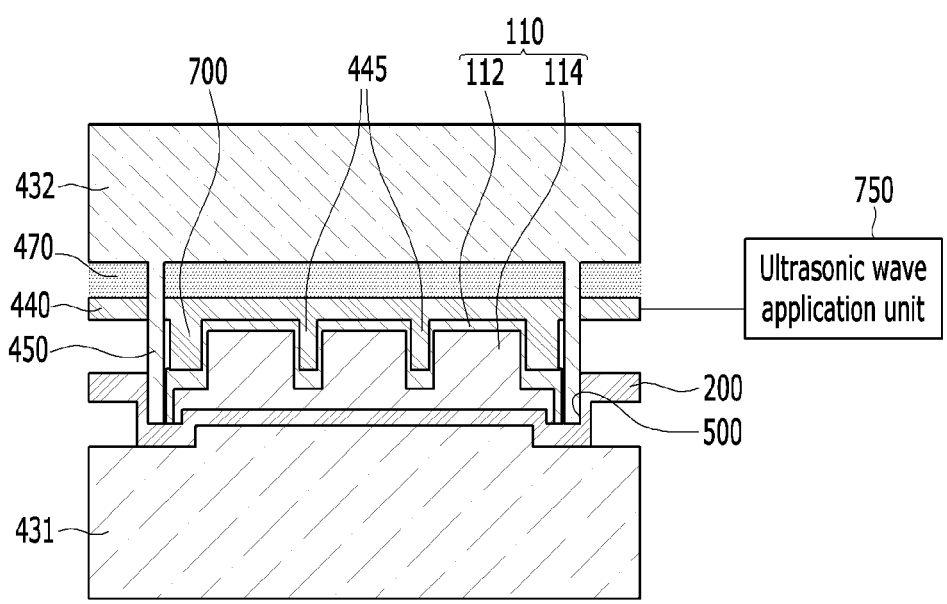
FIG. 7 is a schematic cross-sectional view of a system that forms a pattern in a fabric member and attaches the fabric member to a trim according to another exemplary embodiment of the present invention.

FIG. 7 is a schematic cross-sectional view of a system that attaches a fabric member to a trim while forming a pattern in the fabric member according to another exemplary embodiment of the present invention.

Referring to FIG. 7, when a first mold 431 moves down, insertion blades 450 penetrate a compression jig 440 and thus a fabric member 110 is fixed to a trim 200 by being inserted into trim grooves 500 of the trim 200, and pattern protrusions 445 formed in the compression jig 440 form a pattern in the fabric member 110. Then, fixing protrusions 700 press the fabric member 110 to prevent the fabric member 110 from being misplaced on the trim 200.

Referring to FIG. 7, the compression jig 440 may be used during a cold engine state, but in order to form a pattern more in detail, a ultrasonic wave application unit 750 is connected to the compression jig 440 to apply a ultrasonic wave of a predetermined frequency when the compression jig 440 form a pattern.

That is, the compression jig 440 may be used as a simple cold jig and is excellent for implementation of various patterns, but when the compression jig 440 is connected with the ultrasonic wave application unit 750 and compressed for implementation of a more detailed pattern, vibration of the compression jig 440 may occur.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A system that attaches a fabric member to a trim while forming a pattern in the fabric member, the system comprising:
    a first mold having a predetermined location where a trim having trim grooves can be placed;
    a compression jig configured to be disposed on a fabric member having a predetermined shape, wherein the compression jig includes pattern protrusions to form a pattern in the fabric member and fixing protrusions to fix the fabric member to the trim, the first mold and the compression jig being arranged so that the fabric member can be placed on the trim at the predetermined location; and
    a second mold having injection blades that protrude at predetermined locations of a molding side of the second mold and are configured to partially press the fabric member to fix the fabric member to the trim by inserting the fabric member into the trim.

2. The system of claim 1, further comprising a heater configured to heat the fabric member.

3. The system of claim 2, further comprising a cutter configured to cut the fabric member into a predetermined shape before the fabric member is heated by the heater.

4. The system of claim 2, wherein the heater is provided in a molding side of the second mold.

5. The system of claim 2, further comprising a coating device configured to coat a bonding member to one outer surface of the fabric member before the fabric member is heated by the heater.

6. The system of claim 2, wherein the fabric member comprises a skin material that is exposed to the outside and a foam formed in one side of the skin material.

7. The system of claim 1, wherein insertion blades are configured to fix the fabric member by penetrating the compression jig and inserting the fabric member into the trim grooves.

8. The system of claim 1, wherein a mounting surface of the first mold, on which the trim is to be placed, is formed along the shape of the trim.

9. The system of claim 1, further comprising an ultrasonic wave application unit configured to apply an ultrasonic wave of a predetermined frequency to the compression jig.

* * * * *